United States Patent [19]
Davy

[11] Patent Number: 5,655,119
[45] Date of Patent: Aug. 5, 1997

[54] METHOD FOR MOVING AN OPEN FILE BEING ACCESSED BY AT LEAST ONE USER

[75] Inventor: William R. Davy, Dublin, Ohio

[73] Assignee: Axent Technologies, Inc., Rockville, Md.

[21] Appl. No.: 600,080

[22] Filed: Feb. 12, 1996

Related U.S. Application Data

[63] Continuation of Ser. No. 400,002, Mar. 6, 1995, which is a continuation of Ser. No. 987,755, Dec. 7, 1992, abandoned.

[51] Int. Cl.[6] .................................................. G06F 17/30
[52] U.S. Cl. .................................................. 395/616
[58] Field of Search ................. 364/DIG. 1, DIG. 2; 395/425, 600, 616

[56] References Cited

U.S. PATENT DOCUMENTS

| | | | |
|---|---|---|---|
| 5,008,853 | 4/1991 | Bly et al. | 364/900 |
| 5,021,946 | 6/1991 | Korty | 364/200 |
| 5,163,148 | 11/1992 | Walls | 395/600 |
| 5,175,852 | 12/1992 | Johnson et al. | 395/600 |
| 5,212,786 | 5/1993 | Sathi | 395/600 |
| 5,237,682 | 8/1993 | Bendert et al. | 395/600 |
| 5,276,867 | 1/1994 | Kenley et al. | 395/600 |
| 5,276,871 | 1/1994 | Howarth | 395/600 |
| 5,333,315 | 7/1994 | Saether et al. | 395/600 |
| 5,410,667 | 4/1995 | Belsan et al. | 395/425 |

*Primary Examiner*—Thomas G. Black
*Assistant Examiner*—Maria N. Von Buhr
*Attorney, Agent, or Firm*—Baker & Botts, L.L.P.

[57] ABSTRACT

A method for moving open files on a computer system is disclosed. According to one aspect of the invention, an open file may be accessed by a user while being moved. To ensure accuracy, if data is to be written to an open file while it is being moved, the data is written to both the old and new locations.

16 Claims, 4 Drawing Sheets

METHOD FOR MOVING AN OPEN FILE BEING ACCESSED BY AT LEAST ONE USER

This application is a continuation of application Ser. No. 08/400,002, filed Mar. 6, 1995 entitled "METHOD FOR MOVING AN OPEN FILE BEING ACCESSED BY AT LEAST ONE USER, which is a continuation of application Ser. No. 07/987,755, filed Dec. 7, 1992, now abandoned.

FIELD OF THE INVENTION

The invention relates to an apparatus and method for moving open files in a computer system.

BACKGROUND OF THE INVENTION

It is well known in the computer field that for performance and other reasons, it is desirable to defragment (i.e., consolidate the segments of a file into one logically contiguous location on a disk) and/or optimize the position of files at a location on a disk other than their current location. Typically, defragmenting and positioning have been performed on files not currently in use.

Commercial defragmenters and disk optimizers (which both defragment and/or optimize file position on a disk) have been available for a number of years. Specifically, defragmenters and disk optimizers for use in the VAX/VMS marketplace are available. While the discussion herein is primarily directed to the VAX/VMS, application of this method to other systems will be readily apparent to one of ordinary skill in the art. However, none of these products can move files that are concurrently being read and written (i.e., "open" files). These commercial defragmenters and disk optimizers have a number of key features which are necessary to make them generally useful. Among these necessary and currently available functions are the following.

First, the software must run in a VAXcluster. VAXcluster is the name of the software environment created by DEC which allows multiple VAX systems to be linked together in such a way that any or all of the systems can share the disks on any or all of the other systems just as though those disks were attached to the local systems.

Second, the operation must be completely transparent to any and all user applications. That is, all user programs must run exactly the same and produce the exact same results, regardless of whether or not files are being defragmented or moved. Currently available software accomplishes this feat in part by not moving files that are currently being accessed by other users. If another user were to try to access the file being moved, that user would either be stalled until the file move was completed or else the file move would be aborted, leaving the old version of the file for the user to access.

Third, the move file operation must be "atomic." That is, a file can never be left in an intermediate state. For example, it is possible that a system can crash at any time (for example, due to a power failure, hardware failure, etc.). Regardless of the nature of the failure, the file must be left either in its original state or else in its completely copied state.

The reference to "locks" herein is intended to refer to the standard Distributed Lock Manager locks described in the VAX/VMS documentation set. These are logical locks on arbitrary "resources" whose names can be up to 31 characters. The lock manager is a standard part of the VMS operating system and is maintained cluster-wide by VMS through standard VMS system calls. A working knowledge of the Distributed Lock Manager is assumed.

One prior software package is called Perfect Disk ("PD"), which operates as follows. When a process in the VMS file system tries to open, close, extend, or delete a file, the XQP (the file system processing code) takes out a "protected write" mode (PW) lock on the file that is called the "file serialization" lock. Its name is F11B$s+the file identification number. This lock will be referred to herein as the F11B$s lock or the file serialization lock. By taking out this lock, the system can check the status of the file (opened, closed, etc.) and be guaranteed that no other user will change the status while it is doing so. When the status check or state change is completed, the XQP gives up the lock so that other users may access the file.

When PD determines that it would like to move a particular file, it starts by taking out "file serialization" lock in "protected read" (PR) mode with a "blocking AST" (the blocking AST causes a notification if another user tries to take out an incompatible lock). While it holds the F11B$s lock in PR mode, no other users in the cluster can change the state of its access. In particular, if no other user has the file open, then no other user can access the file while the lock is held.

After PD acquires the lock, it checks locally to determine if another user has the file open locally. This is done by searching the file control blocks (FCBs) maintained in main memory by the XQP for all open files. If it is not open on the local node, then PD takes out a "file access arbitration" lock (referred herein as the F11B$a lock) in null (NL) mode. If a file is open on any node in a VAXcluster, then there exists such a lock on that node. PD can then do a $GETLKI (get lock information) system call and determine how many such locks exist in the cluster. If there is more than one (PD's lock), then another user has the file open and PD will not attempt to move the file. PD then drops the F11B$a lock since it has no further use for it at that time. Assuming the process is to continue, PD then allocates space on the disk at the target location for the defragmented/optimized version of the file. It reads the file data from the old location and writes it to the new location. A verification pass can be performed if desired to guarantee that the data was correctly copied. Up to this point, if the system crashes for some reason, the old file exists as always and there is no problem. The space allocated for the new version of the file will be deallocated when the disk bitmap is rebuilt, a normal operation at start-up.

As is well known, a file on a disk contains not only the data portion of the file, but also a file header containing "metadata." This file header contains data about the file including its name, size, creation, last backup, expiration, and modification dates, and mapping pointers that describe where the data portion of the file exists on the disk. The file header typically exists in block(s), and if it exists in more than one block, PD only moves the portion mapped by one file header block at a time. PD reads the old header, rewrites the file mapping pointers in memory, and then queues the rewrite of the header to disk. Either this rewrite succeeds or it fails. If it succeeds, then the file exists at its new location. If it fails, it exists at its old location. PD then deallocates the space where the old version of the file existed and drops the F11B$s lock so other users can then access the file. Note that any user that tried to access the file while PD was copying it was naturally put into a wait state by the lock manager (the process would be waiting to get its F11B$s lock in PW mode). When PD drops the F11B$s lock, the process may resume.

The foregoing method is useful for moving files (or segments) that are not open. However, various problems arise when trying to move open files. As a result, the above scheme is inadequate to move "open files" (i.e., files that are being accessed for read or write by other users). While it has been previously recognized that it would be desirable to perform these functions while users are using the system and perhaps even the very file(s) to be defragmented or positioned, no solution to the various problems associated with such a capability has been provided. For example, in trying to move open files, one or more of the following problems may arise, among others.

A user that has the file open (anywhere in the cluster) has two data structures in memory that describe the state of the file and its location. The first is the file control block (FCB) mentioned before. It may have information that indicates the logical blocking number on the disk of the first block of the file (if the file is contiguous). It also has a "window control block" (WCB) that indicates where at least a portion of the file exists on the disk. If PD moves the file without causing these structures to be updated, then the reads and writes depending upon these structures will read and write where the file previously existed. This is undesirable.

For example, consider the case where a user is writing to the file while it is being copied. The writes must be coordinated with the copy of the file. For example, if a portion of the file has been read from the old location and written to the new location, then the writes must be made over the new portion of the file. If the write is to a portion of the file that has not yet been copied, then it must be made to the old portion of the file so that when PD copies over the new portion of the file, updated data will be written. If a user extends a file (that is, allocates more space to the file, and perhaps writes new data to it), PD must make sure that the new segment(s) of the file exists somehow in the new version of the file. If a user write to the file's new location should fail to properly write the data due to some I/O error (perhaps a bad spot on the surface of the disk) that would not have occurred writing to the file in its old location, then PD must be notified that the new copy of the file is bad so that it will not complete the copy operation. Various other concerns and problems also exist when trying to open files.

DEC and third-party developers have written products for the highly competitive defragmenter market since at least 1985 but none of these products has moved open files. Potential developers would be highly motivated to provide such a capability because of the great marketing and technical advantages of being able to work on all of the files on a disk instead of just a portion of them. The failure of others to provide a workable solution evidences the long-felt but unfulfilled need to move open files.

SUMMARY OF THE INVENTION

It is an object of the invention to overcome these and other drawbacks of the prior art. More specifically, it is one object of the invention to provide a method for moving open files.

In order to solve the foregoing and other problems, a cooperating "server" process is provided on each node in the VAXcluster. In this description, the file moving process will be called PD, and the server process will be called PD_SERVER.

DETAILED DESCRIPTION OF THE PREFERRED EMBODIMENTS

Before attempting to copy a file, the PD_SERVER process is started on every node in the cluster on which the file to be copied is open. In this particular implementation, PD automatically tries to start the server on every node in the cluster before it tries to copy its first file so that it does not suffer the overhead at each file copy.

There are a number of ways to start processes on both local and remote nodes as will be readily apparent to one skilled in the art. In this implementation, PD copies the server process code to the disk being optimized and then uses "SYSMAN," a VMS utility, to start it from a spawned process.

Figure 1:
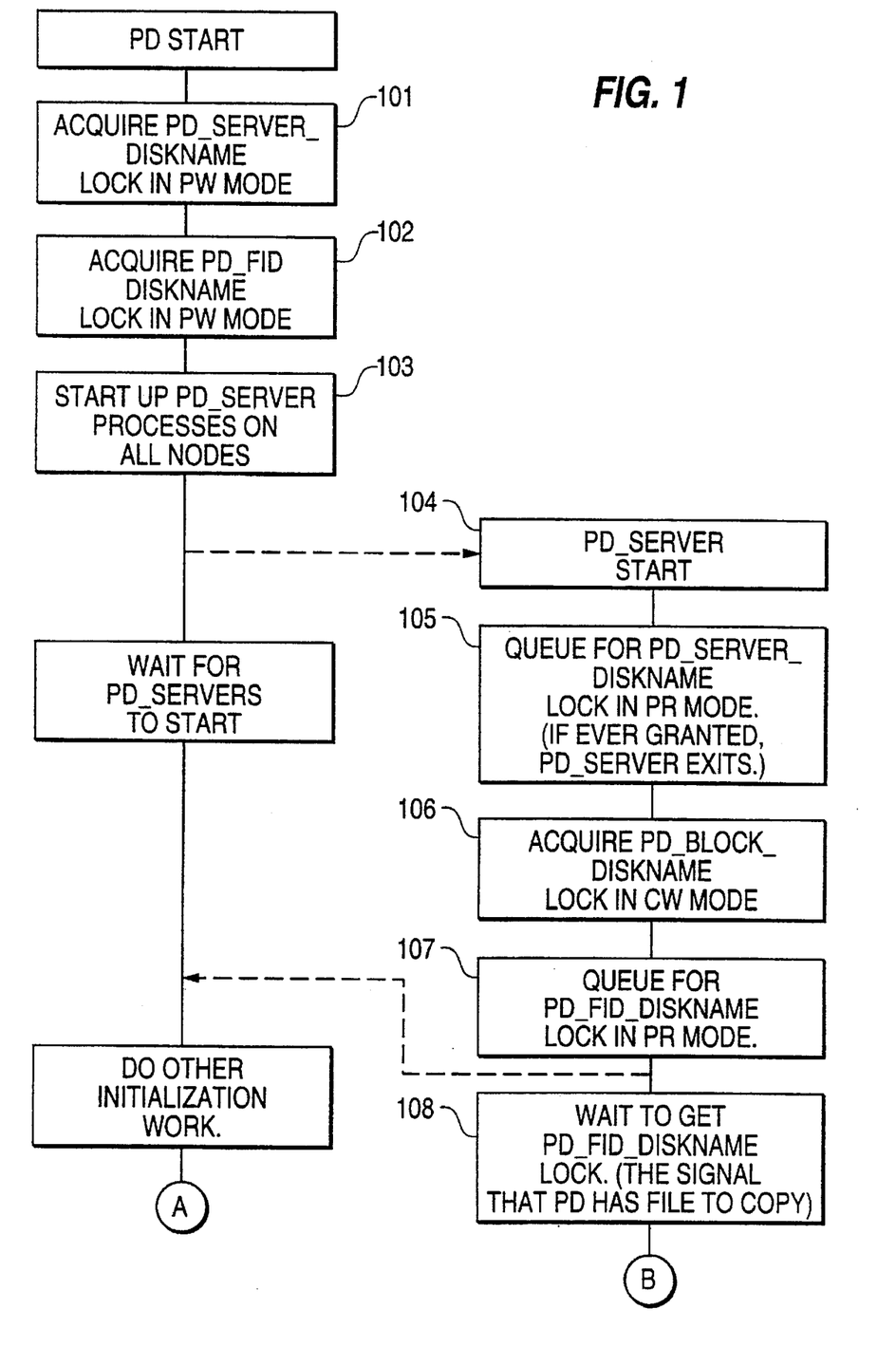
FIG. 1 is a flow chart illustrating a portion of the initial operation of PD and PD_SERVER.

As shown in FIG. 1, for example, before starting the PD_SERVER processes, PD takes out a lock with the name PD_SERVER_diskname (where diskname is the name of the disk to be optimized) in PW mode (101). It holds this lock as long as it is working on the disk. When it gives up the lock, it is a signal to the PD_SERVER processes that PD is no longer interested in the disk and that the PD_SERVER process should exit. If the node upon which PD is running should crash, then the other nodes are automatically notified because this lock will go away when the node does. Before starting the PD_SERVER processes, PD also takes out a lock with the name PD_FID_diskname in PW mode (102). This lock has several uses as discussed below. For example, this lock is used to signal to the PD_SERVER processes that a new file is being copied, which file is being worked upon, and completion status (success or failure) of the copy operation. The PD_SERVER can tell which disk it is being run from and therefore, it knows which disk it is serving. It also makes checks to see that it is the only copy of PD_SERVER which is serving that disk. If there is already another such process, it just exits. Once the PD_Server processes are started (103, 104), the PD_SERVER process queues a lock with the name PD_SERVER_diskname in PR mode (105). This lock is incompatible with the PD_SERVER_diskname lock held by the PD process. If the lock is ever granted, it is a signal that the PD process is exiting or that the PD process's node has crashed. If PD_SERVER is currently assisting with the copying of a file, it also serves as a signal that the copy will not be completed and the final update should not be made. The PD_SERVER process then takes out a lock with the name PD_SERVER_diskname in concurrent write (CW) mode (106). (This lock mode is compatible with other CW mode locks on the resource but not with PW locks. The utility of this will become apparent from the discussion below). The PD_SERVER process then queues for a PD_FID_diskname lock in PR mode (107). The PR mode is compatible with similar locks queued for by the PD_SERVER processes but not with the PW lock held by PD. PD_SERVER waits for the lock to be granted (108).

Meanwhile, PD identifies a file to be copied and starts a file copy operation at A (FIG. 2) similar to the one described for moving closed files. In step 201 it takes out the F11B$s lock on the file in EX mode to keep other users from opening, closing, extending, deleting, or truncating the file while it holds the lock. It checks for other users accessing the file anywhere in the cluster. If none are accessing it, then the normal closed file copy procedure may be used. However, if the file is open anywhere on the system, PD checks that PD_SERVER is holding the PD_FID_diskname lock on every node that has the file open. It is not necessary for the PD_SERVER to be running on nodes that do not have the file open (202). If all such nodes have not successfully started and maintained the PD_SERVER processes, then the file will not be copied. PD solves the problem(s) of other users opening the file during the copy by not relinquishing the F11B$s lock during the copy. It also avoids the problem (s) of other users closing, extending, truncating, or deleting the file because none of these operations can occur while PD is holding the F11B$s lock.

Figure 2:
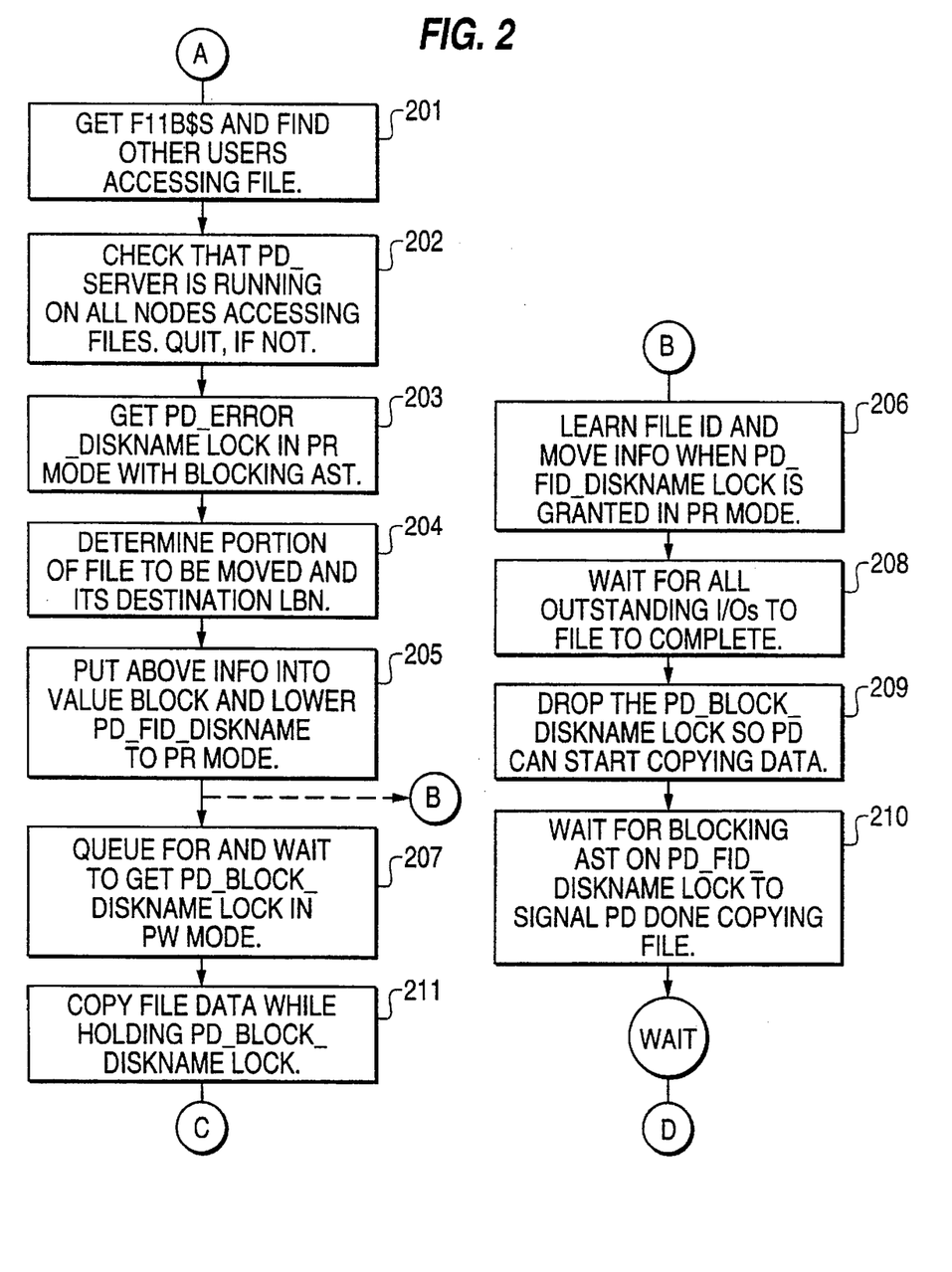
FIG. 2 and 2a show the flow of control for a portion of PD and PD_SERVER.

PD then takes out a lock on PD_ERROR_diskname lock in PR mode with blocking AST (203). If a PD_SERVER process queues for a PD_ERROR_diskname lock in CW mode, PD will get such a blocking AST. This is a mechanism that is used for the PD_SERVER processes to notify PD that an error has occurred "remotely" which should cause PD to abort the copy operation without updating the header to point to the new data.

PD next determines which part of the file it will move (it doesn't necessarily have to move the entire file) to what location on the disk and allocates that space (204). When all of this setup is completed, PD notifies the PD_SERVER processes by writing the file ID (a unique identifier), the starting virtual blocking number (VBN) of the file to be copied, the number of blocks to be copied, and the starting logical blocking that the new portion of the file will occupy into the "value block" of the PD_FID_diskname lock and converts the PD_FID_diskname lock from the PW to PR mode (205).

When PD lowers the PD_FID_diskname lock to PR mode, any waiting requests for the PD_FID_diskname locks in PR mode in all of the PD_SERVER processes are granted (206). The PD_SERVER processes then read the lock's value blocking to learn the file ID, starting VBN, number of blocks to be copied, and target LBN. At this point, the PD_SERVER processes are ready to cooperate with PD in the file copy. However, the PD_SERVER process must stall the PD process from starting the file copy until certain housekeeping functions are taken care of.

It must be guaranteed that user processes will read and particularly write to the fight location on the disk while PD is copying a file. While PD is copying a file and before it updates the header, all of the user processes can read the file from its original position. The old data is there the entire time, and furthermore, VMS naturally makes the processes read the fight data under all conditions. So reads are not a particular problem while PD is copying the data to the new location.

Writes to the file are, however, a particular problem. It is not sufficient to write any given I/O to just one of the old or new locations of the file. While it might seem that some scheme would allow the data to be written to just one location or the other, depending upon PD's progress at copying the data, this is not adequate since, for example, PD may fail to complete the copy. (For example, its node might have a power failure, etc.) Therefore, all writes to the file during the PD copy phase are preferably written over the old version of the file. Furthermore, if PD has already copied that area of the file to its new location, the write must also occur at the new location. The solution therefore, is to make all write I/Os write to both locations. Methods for "shadowing" disk I/Os (i.e., making them write in two or more locations), in general, are known to those skilled in the art, but have not been used for this particular purpose. PD_SERVER can identify and shadow just exactly those I/O since it knows which blocks in which files must be shadowed.

However, there remain at least three other problems related to the file copy phase that must be recognized and addressed. First, when PD wants to start copying a file, PD_SERVER acquires the PD_FID_diskname lock as described above and is ready to go. It knows to shadow all future write I/Os to the file until the copy phase is done. However, this alone is inadequate. It is possible that one or more write I/Os to the file were queued before PD wanted to copy the file, but that for one reason or another, have not yet completed. (Though unlikely, in VAXclusters, it is possible that disk I/Os may take minutes or even hours to complete.) Therefore, PD must wait to start its copy until all outstanding write I/Os to the file have completed.

Another problem is that even though shadowing the write I/Os to both the old and new copies of the file is occurring, the system still must synchronize the write I/Os. with the PD copy process for at least the following reason. Suppose that during the copy phase, PD reads some block of data from the old location of the file, but before it can write it out to the new location, a user process writes that block of data. Even though the user write is shadowed to the new location, if it is written before PD can write its version of the data to the new location (and that is quite possible), user data will be lost in the new portion of the file. If the file copy is completed by PD, the user data will be lost. Therefore, writes to the disk should preferably be synchronized to prohibit this possibility.

Finally, when PD is done copying the file, it must point the file header mapping pointers to the new location of the file, rewrite the file header, and then deallocate the space where the file previously but no longer exists. This space can then be allocated to another file. If PD_SERVER was shadowing a write I/O to the file and the I/O was somehow delayed (a distinct possibility), when it completed later on, it might incorrectly write old data over another file. The following solutions overcome these potential problems.

Figure 3:
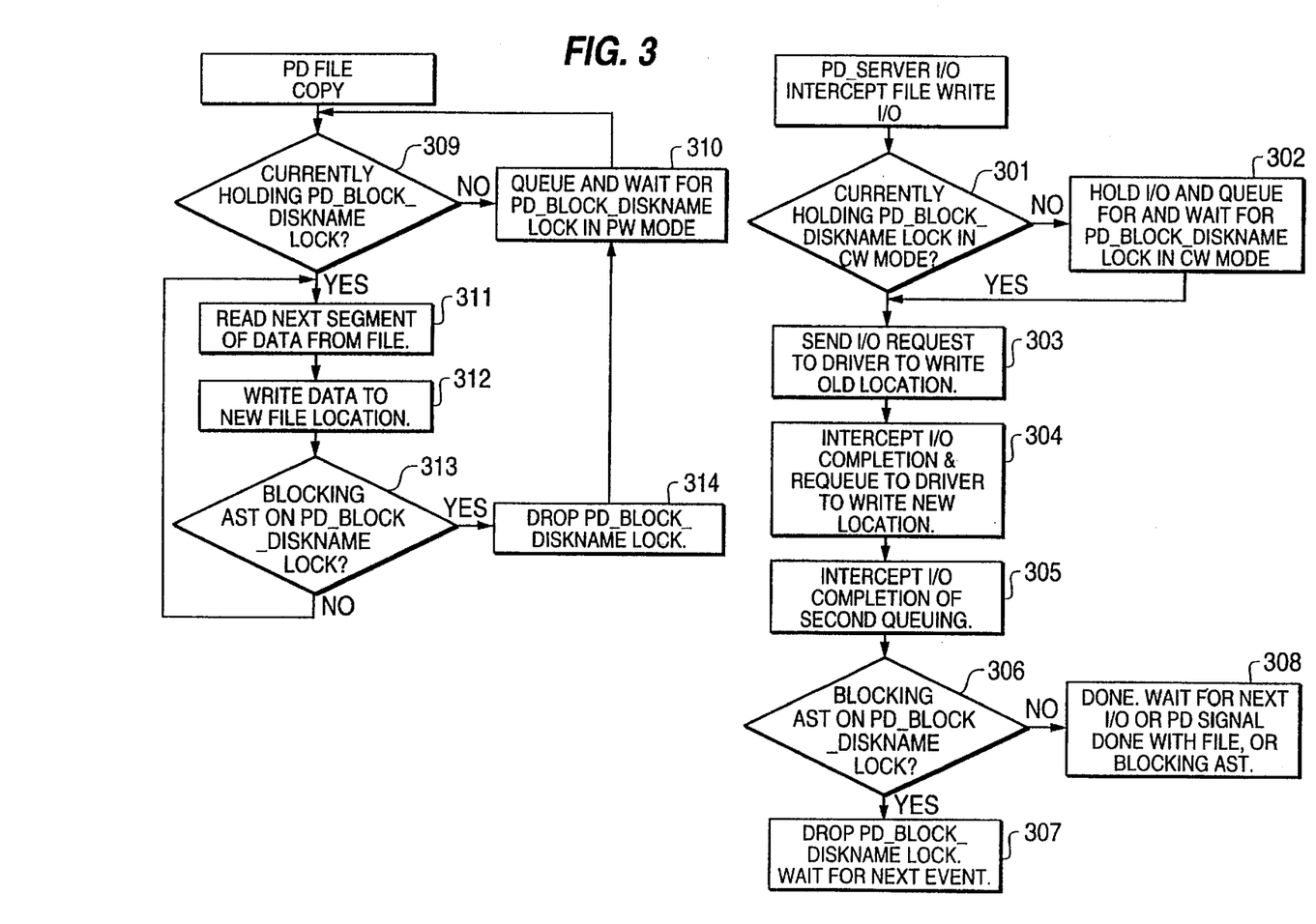
FIG. 3 is a flow chart illustrating a portion of the synchronization of PD and a user file I/O.

In order for any user process on any node to be able to write to a file being copied, the PD_SERVER process must hold the PD_BLOCK_diskname lock in CW mode. In order for PD to do a read and then write of any data in the file for its copy operation, it must hold the PD_BLOCK_diskname in PW mode. While any PD_SERVER holds this lock in CW mode, PD cannot hold the lock in PW mode. So PD is preferably programmed so that it will not do the copy unless it holds the PD_BLOCK diskname lock in PW mode and the PD_SERVER processes are preferably programmed to stall all write I/Os (302) until it holds the PD_BLOCK_diskname lock in CW mode. (Acquiring and releasing the locks is standard VMS lock work for those skilled in the art.) This solves the problem of users writing data during PD copy read-then-write copy operations. As shown in FIG. 3, for example, this may be implemented as follows.

To write to a file being copied, PD_SERVER determines whether it is currently holding PD_BLOCK_diskname lock in CW mode (301). If not, it holds the I/O and queues and waits for PD_BLOCK_diskname lock in CW mode (302). When this occurs, it sends the I/O request to the driver to write to the old location (303). When complete, it requeues the driver to write to the new location (304). Upon completion of the second queuing (305), it determines whether there is a blocking AST on PD_BLOCK_diskname lock (306). If yes, it drops the PD_BLOCK_diskname lock and waits for a next event (307). If not, it is done and waits for the next I/O or PD done with file or blocking AST signal (308).

Meanwhile, PD determines whether it holds PD_BLOCK_diskname lock (309). If not, it queues and waits for PD_BLOCK_diskname lock in PW mode (310). If yes, it reads the next segment of data from the file (311), writes data to the new file location (312) and determines whether there is a blocking AST on PD_BLOCK_diskname lock (313). If yes, PD drops the PD_BLOCK_diskname lock (314) and control returns to 310. If not, control passes to 311.

To make sure that there are no latent I/Os at the start or finish which would cause other problems (for example, as described above), the PD_SERVER process stalls operations as follows. As described above, at the start of a file copy operation, PD_SERVER acquires the PD_FID_diskname lock which tells it which file is to be moved (206), but it is already holding the PD_BLOCK_diskname lock in CW mode (106) so that PD cannot actually start the data transfer. PD_SERVER then watches all of the new diskname I/Os that are queued to the diskname device from the local node. It passes all of the I/O requests onto the driver except for the I/Os to the file being copied (208), which it holds in a temporary queue. It then compares the number of requests in its temporary queue with the VMS device driver field (UCB$W_QLEN) which contains the number of outstanding I/Os on the device. When the two numbers are equal, then there are no previously queued I/Os to the file still outstanding. This allows the diskname to service all other I/Os and still stall the key ones as long as necessary. When all of the outstanding I/Os for the file have been "collected" in the temporary queue, synchronization has been accomplished and they are just requeued to the driver in the standard VMS way. If PD is just starting to process a new file, then when they are reprocessed by the driver, PD_SERVER will intercept them and shadow the writes properly. If PD is finishing a file, PD_SERVER will have done its cleanup, and will cause only the second half of the shadowing to occur. That is, the part in which the new location of the file is written.

Referring to the flow of a file copy, once PD_SERVER has performed the above described stall operations, it waits for the outstanding write I/Os to complete (208). PD_SERVER then drops the PD_BLOCK_diskname CW lock (209). When all of the servers have done so, PD's request for the PD_BLOCK_diskname PW lock will be granted (207) and PD can copy file data (211). PD will hold the lock through each individual sequence of reading and write each portion of the file. (A large file may require many reads and writes.) At the end of each individual read/write, PD will check to see if any PD_SERVER has requested the PD_BLOCK_diskname. If so, PD will drop the lock, which will allow other users to write the file as described, and then will requeue for it. When the other write(s) have completed, the PD_SERVER process(es) will drop the PD_BLOCK_diskname lock(s) and PD will reacquire the PD_BLOCK_diskname PW lock and then can continue its read/write operations.

From the PD_SERVER viewpoint, PD_SERVER is watching all of the diskname I/O requests. If it encounters a write I/O to the file being copied, rather than sending the request on to the driver, it stalls the request until the PD_SERVER_diskname lock is acquired in CW mode. When it gets the lock, it then sends the request to the driver to write to the original location. When the original request is completed, it then shadows the I/O to the new location. Only then does PD_SERVER drop the PD_BLOCK_diskname lock so that PD can start another read/write operation. If PD_SERVER detects an error in either of the writes, then PD_SERVER takes out a lock with the name PD_ERROR_diskname in CW mode (220). This is incompatible with PD's PR lock on the resource, so a blocking AST is generated in PD which informs PD that there is an error somewhere and that PD should not finish moving the file and control passes to 225.

Otherwise, PD finishes copying the data portion of the file. Up to this point, there is no problem if any of the systems in the cluster should crash. If the system running PD crashes, then its PD_SERVER_diskname PW lock is released, all of the remaining PD_SERVER process acquire their locks and know to exit without finishing a file update. The original file and data structures are just as before the start of the copy. If any of the remote nodes running PD_SERVER crash, there is no problem because they will not be doing any I/O to the file and will not be able to do so until the copy is completely finished.

Then, PD (while holding the PD_BLOCK_diskname lock in PW mode) rewrites the file header pointing to the new location of the data (221). Once again, if any of the remote nodes crash, there is no problem because the new file will exist properly when the system is rebooted. If the node running PD crashes, the signalling scheme still works. The PD_SERVER processes will acquire the PD_SERVER_diskname lock and know that there was a failure. PD_SERVER will mark the file's FCB and WCBs stale so that the file system will reread the file header (PD may or may not have updated it.) Any pre-existing write I/Os will be shadowed to both the old and new locations. Since the PD process had not yet deallocated the old file space, it is safe to write to both places. New I/Os will write to the proper place.

Figure 2A:
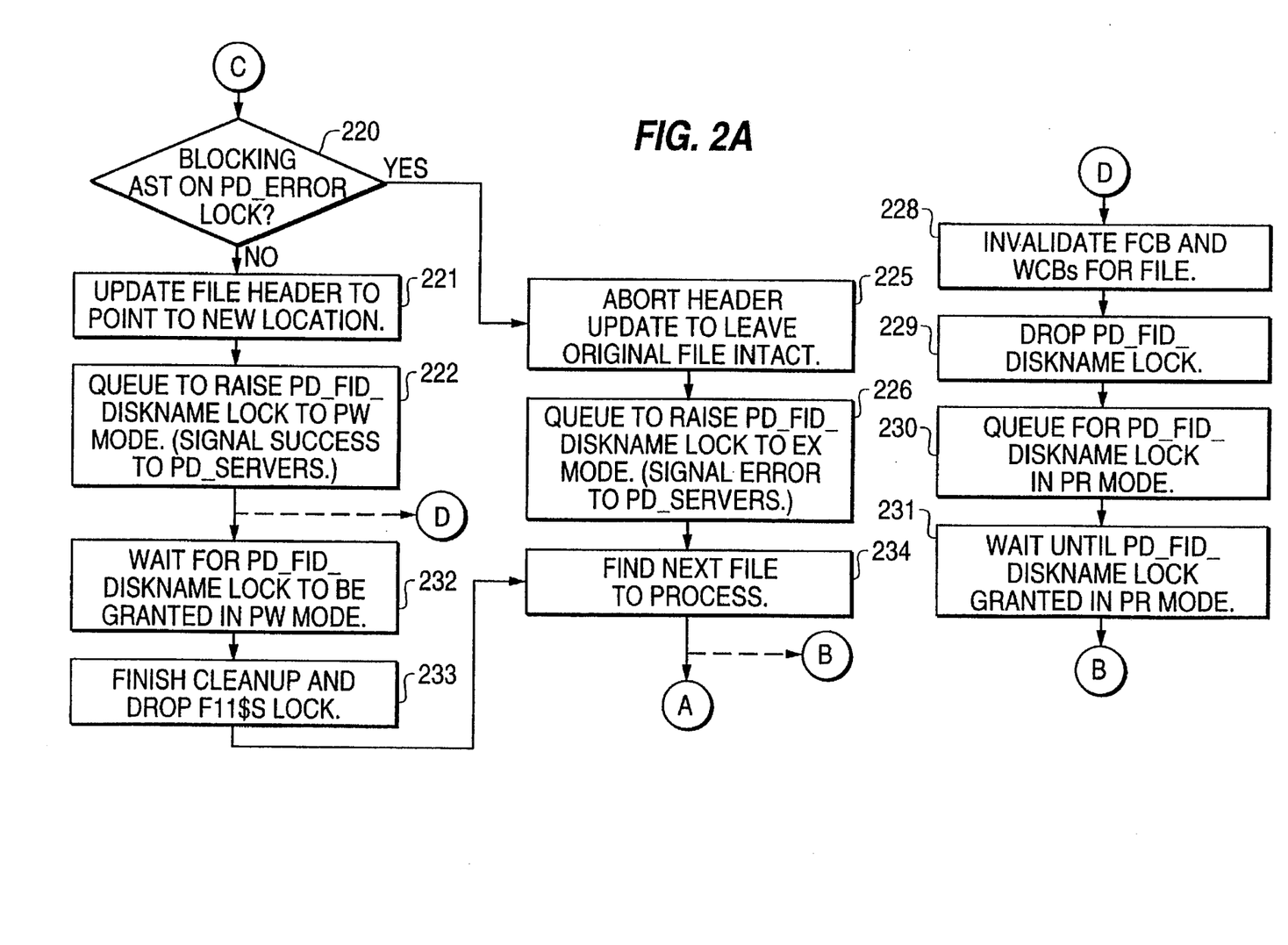

After writing the header (221), PD drops the PD_BLOCK_diskname lock so that outstanding I/Os are allowed to proceed by PD_SERVER. PD queues to convert its PD_FID_diskname to PW mode if the copy was a success (222) (or to EX mode if the header was not updated (226)). Meanwhile, the PD_SERVER processes, which are holding the lock in PR mode, receive a blocking AST which informs them the PD is done copying the file (210). Then PD_SERVER checks the lock mode of the PD request to determine success or failure, but it matters little. In either case, PD_SERVER marks the FCB and WCBs "stale" (228) so that the file system must reread the file header so that new I/O requests will read/write the file in its new location. PD_SERVER does its "stall" operation so that outstanding I/Os (possibly shadowed) can complete. Upon completion of all outstanding I/Os, PD_SERVER drops the PD_FID_diskname lock to signify to PD that it has done all its cleanup (229). PD_SERVER requeues for the PD_FID_diskname lock (230) so that it will be ready for the next file to be copied by PD (231).

When all the PD_SERVERs have dropped their PD_FID_diskname locks (229), PD acquires the lock in PW mode (232) and knows that the PD_SERVER cleanup is complete. At this point, PD deallocates the diskname space where the old file no longer resides, and finally, PD drops the F11B$s lock (233) so that other users may open, close, extend, truncate, or delete the file in the normal manner. This completes the file copy operation and PD finds the next file to process (234).

The foregoing is a description of the preferred embodiments of the present invention. However, various modifications within the scope of the invention will be readily apparent to those skilled in the art. The invention is only limited by the claims appended hereto.

I claim:

1. A method for moving an open file in a computer system, wherein said open file is currently being accessed by at least one user, said method comprising the steps of:

identifying an open file which is located at a first portion of a disk, where at least a portion of said file is to be moved to a second portion of said disk;

moving at least a portion of said open file to said second portion of said disk, said moving step comprising the steps of:

(a) copying said portion of said open file to said second portion of said disk;

(b) updating said open file at said first portion of said disk and said copied portion at said second portion of said disk in response to a request to write to said open file received after completion of said identifying step; and, (c) deallocating said first portion of said disk after completion of said copying step.

2. The method of claim 1 further comprising the step of acquiring and maintaining a lock on said open file while said open file is being moved to said second portion of said disk wherein said lock prevents said user from extending or truncating said open file while said lock is maintained on said open file.

3. The method of claim 2 wherein said access by at least one user comprises a request for reading or writing data and wherein said access by at least one user further comprises a first set of user access requests which are initiated prior to completion of said identifying step and a second set of user access requests which are initiated after completion of said identifying step and prior to initiation of said moving step and further comprising the steps of:

queuing said second set of user access requests after completion of said identifying step until initiation of said moving step;

executing said first set of user access requests;

initiating said moving step; and executing said second set of user access requests from said queue after said initiating step.

4. The method of claim 3 wherein said access by at least one user further comprises a third set of user access requests which are initiated during said moving step and further comprising the steps of:

executing said third set of user access requests after completion of said moving step and said step of executing said second set of user access requests; and releasing said lock.

5. The method of claim 4 wherein said open file comprises header information associated therewith and wherein said header information includes information identifying at least a location of said first portion and further comprising the steps of:

updating said header information associated with said open file before said releasing step and after said moving step; and writing data for said open file to only said second portion of said disk after completion of said updating step until said releasing step has been completed.

6. The method of claim 1 wherein once said step of updating said first and second portions of said disk begins, no portion of the open file is copied until said data is written to both said first and second portions of said disk.

7. The method of claim 1 wherein said copying step comprises a plurality of read/write sequences and wherein said updating step occurs subsequent to one of said read/write sequences.

8. In a computer system comprising one or more disks, said system comprising means for defragmenting files by moving at least a portion of said files and by moving file positions on at least one of said disks, a method for moving at least a portion of an open file while said file is being accessed by a user, said method comprising the steps of:

determining a portion of said file to be moved from a first location to a second location;

copying said portion of said file to said second location while enabling said file to continue to be accessed by said user; and, deallocating said first location after said copying step has been completed;

wherein when a user request to write data to said file during said step of copying is made, said data is written to said file by writing said data to both said first and second locations.

9. The method of claim 8 wherein said copying step comprises a plurality of read/write sequences and wherein said writing step occurs subsequent to one of said read/write sequences.

10. The method of claim 8 wherein said access by a user comprises a request for reading or writing data.

11. The method of claim 10 further comprising the step of acquiring and maintaining a lock on said open file while said open file is being moved to said second location wherein said lock prevents said user from extending or truncating said open file while said lock is maintained on said open file.

12. The method of claim 11 wherein said access by a user further comprises a first set of user access requests which are initiated prior to completion of said determining step and a second set of user access requests which are initiated after completion of said determining step and prior to initiation of said copying step and further comprising the steps of:

queuing said second set of user access requests after completion of said determining step until initiation of said copying step;

executing said first set of user access requests;

initiating said copying step; and executing said second set of user access requests from said queue after said initiating step.

13. The method of claim 12 wherein said access by a user further comprises a third set of user access requests which are initiated during said copying step and further comprising the steps of:

executing said third set of user access requests after completion of said copying step and said step of executing said second set of user requests; and releasing said lock.

14. The method of claim 13 wherein said open file comprises header information associated therewith and wherein said header information includes information identifying at least said first location and further comprising the steps of:

updating said header information associated with said open file before said releasing step and after said copying step; and writing data for said open file to only said second location of said disk after completion of said updating step until said releasing step has been completed.

15. A method of moving at least a portion of a file in a computer system, including files being accessed by at least one user, said method comprising the steps of:

identifying at least a portion of a file to be moved, said portion comprising at least one file segment located at a first disk portion and a file header pointing to said first disk portion, wherein said file segment is to be moved to a second disk portion;

determining if said identified portion is being accessed by at least one user, and if so, moving said portion of said file by executing a method for moving open files, said method for moving open files comprising the steps of:

copying said file segment to said second disk portion;

updating said file to be moved at said first disk portion and said second disk portion in response to a request to write to said file received after completion of said identifying step;

rewriting said file header to point to said second disk portion; and deallocating said first disk portion.

16. The method of claim 15 wherein the access by at least one user comprises requests for reading and writing to said identified portion, said requests comprising a first set of user access requests which are initiated prior to completion of said determining step, a second set of user access requests which are initiated after completion of said determining step and prior to initiation of said copying step and a third set of user access requests which are initiated after initiation of said copying step, and further comprising the steps of:

queuing said first set of user access requests until completion of said determining step;

acquiring and maintaining an open file extension/truncation lock on said identified portion after said determining step;

queuing said second set of user access requests after completion of said determining step until initiation of said copying step;

executing said first set of user access requests;

initiating said copying step;

queuing said third set of user access requests after initiation of said copying step;

executing said second set of user access requests from said queue after said initiating step; and executing said third set of user access requests after completion of said copying step and after said step of executing said second set of user access requests;

wherein said user access requests of said second and third sets which involve write operations are performed on the identified portion and the copied file; and, wherein said user access requests of said second and third sets which involve read operations are performed on the identified portion.

* * * * *